United States Patent
Nakajima

(10) Patent No.: US 6,363,433 B1
(45) Date of Patent: Mar. 26, 2002

(54) METHOD AND MECHANISM FOR CLIENT-SIDE HANDLING OF EXTENSIONS ORIGINALLY WRITTEN FOR SERVERS

(75) Inventor: Satoshi Nakajima, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/814,910

(22) Filed: Mar. 12, 1997

(51) Int. Cl.[7] ............................................. G06F 9/54
(52) U.S. Cl. ...................................................... 709/313
(58) Field of Search ................................ 395/700, 701; 707/200, 10–513; 709/219, 203, 224, 330, 201; 345/357

(56) References Cited

U.S. PATENT DOCUMENTS

| | | | | |
|---|---|---|---|---|
| 5,526,523 A | * | 6/1996 | Straub et al. ................ | 395/700 |
| 5,682,534 A | * | 10/1997 | Kapoor et al. ............... | 709/304 |
| 5,732,218 A | * | 3/1998 | Bland et al. ................. | 709/224 |
| 5,740,439 A | * | 4/1998 | Atkinson et al. ............ | 395/701 |
| 5,761,683 A | * | 6/1998 | Logan et al. ................. | 707/513 |
| 5,781,909 A | * | 7/1998 | Logan et al. ................. | 707/200 |
| 5,859,972 A | * | 1/1999 | Subramaniam et al. ...... | 709/203 |
| 5,877,767 A | * | 3/1999 | Yohanan ...................... | 345/357 |
| 5,878,417 A | * | 3/1999 | Baldwin et al. .............. | 707/10 |
| 5,923,885 A | * | 7/1999 | Johnson et al. .............. | 395/712 |
| 5,956,483 A | * | 9/1999 | Grate et al. ............. | 395/200.33 |
| 5,961,588 A | * | 10/1999 | Cooper et al. ............... | 709/203 |
| 5,991,802 A | * | 11/1999 | Allard et al. ................. | 709/219 |
| 6,052,710 A | * | 4/2000 | Saliba ......................... | 709/203 |
| 6,058,178 A | * | 5/2000 | McKendry et al. .......... | 379/212 |
| 6,125,352 A | * | 9/2000 | Franklin et al. .............. | 705/26 |

OTHER PUBLICATIONS

Brockschmidt, Kraig, "Monikers and Linking Containers" (Chapter 12) and Moniker Binding and Link Sources (Chapter 13), *Inside OLE 2*, Microsoft Press, pp. 695–807 (1994).

Gross, Christian, "Taking the Splash Diving into ISAPI Programming", *Microsoft Interactive Developer*, pp. 1–4 (1997).

Ostertag, Krista. "New Online Products—Search technology profies move beyond the Web" abstract, Jun. 1996.*

IONA "Orbix for Java White Paper" Feb. 1996, pp. 1–24.*

SUN. "The Java Language Environment white Paper" Oct. 1995, pp. 72–85.*

Chappell, David. "Understanding ActiveX and OLE" Chapter 6, 1996, pp. 129–153.*

"It All Starts at the Server", IEE Internet Computing, Jan. 2, 1997.*

* cited by examiner

*Primary Examiner*—Alvin Oberley
*Assistant Examiner*—Lewis A. Bullock, Jr.
(74) *Attorney, Agent, or Firm*—Michalik & Wylie, PLLC

(57) ABSTRACT

A method and mechanism for handling the execution of extensions on a client machine, such as ISAPI applications written for a server. When a local browser is notified that an extension is local, the browser creates a moniker for interfacing with the extension. Although local, the moniker appears to the extension to be a server process, whereby the extension executes its function on user data and provides a result to the moniker. The moniker returns the result to the browser for display thereof. The method and mechanism enable extensions developed for remote servers to be locally executed in a client machine, while using the local browser as a user interface.

19 Claims, 4 Drawing Sheets

82

```
typedef struct _EXTENSION_CONTROL_BLOCK {
    DWORD   cbSize;
    DWORD   dwVersion;
    HCONN   ConnID;
    DWORD   dwHttpStatusCode;
    CHAR    lpszLogData[HSE_LOG_BUFFER_LEN];
    LPSTR   lpszMethod;
    LPSTR   lpszQueryString;
    LPSTR   lpszPathInfo;
    LPSTR   lpszPathTranslated;
    DWORD   cbTotalBytes;
    DWORD   cbAvailable;
    LPBYTE  lpbData;
    LPSTR   lpszContentType;
    BOOL (WINAPI * GetServerVariable) ( HCONN hConn,
                    LPSTR    lpszVariableName,
                    LPVOID   lpvBuffer,
                    LPDWORD  lpdwSize );
    BOOL (WINAPI * WriteClient) ( HCONN    ConnID,
                    LPVOID   Buffer,
                    LPDWORD  lpdwBytes,
                    DWORD    dwReserved );
    BOOL (WINAPI * ReadClient) ( HCONN     ConnID,
                    LPVOID   lpvBuffer,
                    LPDWORD  lpdwSize );
    BOOL (WINAPI * ServerSupportFunction)( HCONN    hConn,
                    DWORD    dwHSERRequest,
                    LPVOID   lpvBuffer,
                    LPDWORD  lpdwSize,
                    LPDWORD  lpdwDataType );
} EXTENSION_CONTROL_BLOCK, *LPEXTENSION_CONTROL_BLOCK;
```

FIG. 4

METHOD AND MECHANISM FOR CLIENT-SIDE HANDLING OF EXTENSIONS ORIGINALLY WRITTEN FOR SERVERS

FIELD OF THE INVENTION

The invention relates generally to computer systems, and more particularly to computer applications for returning information to browsers in response to user requests.

BACKGROUND OF THE INVENTION

Early Internet servers were able to process client requests only by receiving a URL (uniform resource locator) sent by a client, accessing a database or file system based on that URL, and returning information corresponding thereto to the client. Such a simple lookup operation provides an essentially a static client-server model, as the server simply receives a location via the URL and returns data stored at that location to the client.

An improvement to the above-described static client-sever model involves the use of a CGI (common gateway interface) script. CGI is a protocol used for communicating between client data and a program on the server side. With CGI, the client typically sends form data along with a program location to the server. Instead of simply returning static data to the user, the server runs the identified program to initially generate some results, and thereafter return the dynamically-generated results as an HTML (Hypertext Markup Language) page. With CGI, the executing program can operate on the input data as desired by the developer, potentially communicating with other servers to generate the results.

By way of example, a client sends a name (e.g., text) as data to a server, along with program information identifying a program for operating on that name data. The server executes the identified program, which (in this example) uses the data to access a stock portfolio associated with the name, possibly by communicating with another server. The executing program further obtains the current prices of the stocks in the portfolio, (again possibly via another server), and uses the portfolio and price information to generate a summary table, in the form of an HTML page, of the named individual's stock holdings. The server then returns the summary table to the client, which the client browser interprets to output a graphical display corresponding thereto. As can be appreciated, the use of CGI script provides a dynamic client-server model, since the result depends on the data sent by the user and the operation of a program on that data.

However, CGI is a rather heavyweight (and therefore expensive) mechanism in that an entire program is loaded and run in response to each CGI request. As a result, a more lightweight mechanism has been developed that uses dynamic link libraries (DLLs) instead of fully executable programs. A DLL is a library of small functions, each of which can be separately (and quickly) linked at run-time to an already-executing process in the server. The use of DLLs can be highly flexible. For example, a server process can selectively maintain in memory any currently-loaded DLLs, thereby avoiding reloading operations for use with other client requests. Long-unused DLLs can be removed from memory to free up space, while still others can be preloaded into memory in anticipation of servicing client requests therewith.

One such lightweight, DLL-based mechanism for processing client requests is Microsoft Corporation's Internet Server Application Programming Interface (ISAPI) for Microsoft Internet Information Server (IIS). ISAPI provides the dynamic aspect of CGI, but with the efficiency gains realized by DLLs. ISAPI DLLs are also called ISAPI applications and/or ISAPI extensions. ISAPI thus provides application developers with an excellent tool for developing efficient server extensions.

However, ISAPI (and other server-side) extensions are significantly and architecturally different from programs written for client-side applications. For example, to return results to a client, server extensions ordinarily construct and transfer a complete HTML page, often including text, images and other information, to a client-side browser. In contrast, local, client-side applications may use some similar code to obtain the results, but then use WIN32 APIs to output those results as graphical data to a user interface written for that application.

Because of these differing architectures, little, if any code can be shared between extensions written for remote servers and applications written for local client machines. Rather than expend resources to develop programs for both architectures, product developers generally choose to develop and market their products either for remote servers (accompanied with an appropriate a server extension) or a local client application, but not both. For example, a developer of a multimedia encyclopedia product on CD-ROM will determine the intended market, and then either write a server extension or a client application for accessing the multimedia data therein. Consequently, someone wishing to use a server-directed encyclopedia product is required to connect as a client to an appropriately-equipped server.

OBJECTS AND SUMMARY OF THE INVENTION

Accordingly, it is a general objective of the present invention to provide a method and mechanism for handling on the client side, extensions written for a server.

Another objective is to provide a method and mechanism of the above kind that enables developers to write a single extension for use with either server or client machines.

In accomplishing those objectives, another objective is to provide a local client application that uses an existing web browser as a user interface.

A related objective is to provide the method and mechanism as characterized above without requiring any significant modifications to the web browser.

Another objective is to accomplish the above objectives while providing a highly efficient, flexible and extensible method and mechanism.

Briefly, the present invention provides a method and mechanism for executing an extension (e.g., ISAPI application) in a local machine. A browser is loaded in the local machine, and is provided with information indicating that the extension is present locally. The browser recognizes the local presence of the extension, and selects and/or creates a moniker object for interfacing between the browser and the extension. The moniker object includes data and code for loading the extension in the local machine and for passing data between the browser and the extension. When the extension processes data received from the browser to produce a result, the result is returned (such as in an HTML document) from the extension to the browser via the interface. The browser displays the result in its intended form, i.e., a graphical, human-readable format.

Other objects and advantages will become apparent from the following detailed description when taken in conjunction with the drawings, in which:

BRIEF DESCRIPTION OF THE DRAWINGS

FIG. 4 is a is a representation of an extension control block used for passing information between an extension and a moniker.

DETAILED DESCRIPTION OF THE PREFERRED EMBODIMENT

Figure 1:
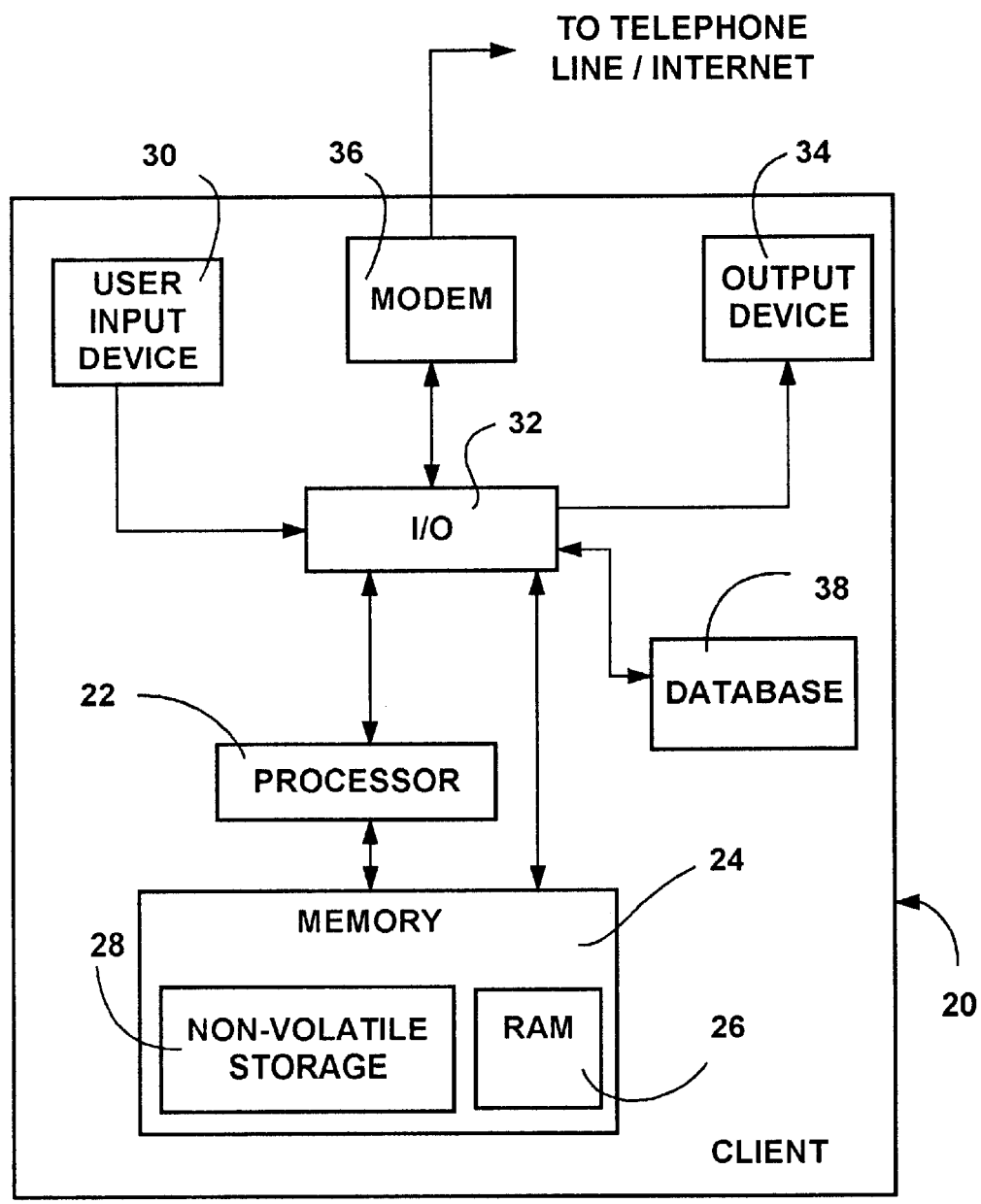
FIG. 1 is a block diagram representing a computer system into which the present invention may be incorporated.

Turning to the drawings and referring first to FIG. 1, there is shown a computer system generally designated 20 into which the present invention may be incorporated. The computer system 20 includes a processor 22 operatively connected to a memory 24, the memory including random access memory (RAM) 26 and non-volatile memory 28 such as a hard disk-drive, optical drive or the like. As can be appreciated, the non-volatile memory 28 can be used in conjunction with the RAM 26 to provide a relatively large amount of virtual memory via well-known swapping techniques.

The computer system 20 also includes at least one input device 30, typically a keyboard and/or a pointing device such as a mouse, connected through input-output circuitry (I/O) 32 for communicating user commands to the processor 22. Similarly, at least one output device 34 such as a monitor and speakers are connected to the I/O 32 for communicating information from the processor 22 to the user of the system 20.

A modem 36 (or equivalent communication device such as a network card) may be provided for enabling the computer system 20 to communicate with other computer-based machines. Although not necessary to the invention, a storage device, exemplified herein as a database 38, is also shown as present within the computer system 20 of FIG. 1. The database 38 may be any type of data stored on any type of storage device, for example, a CD-ROM device with accompanying media containing data comprising an encyclopedia.

Figure 2:
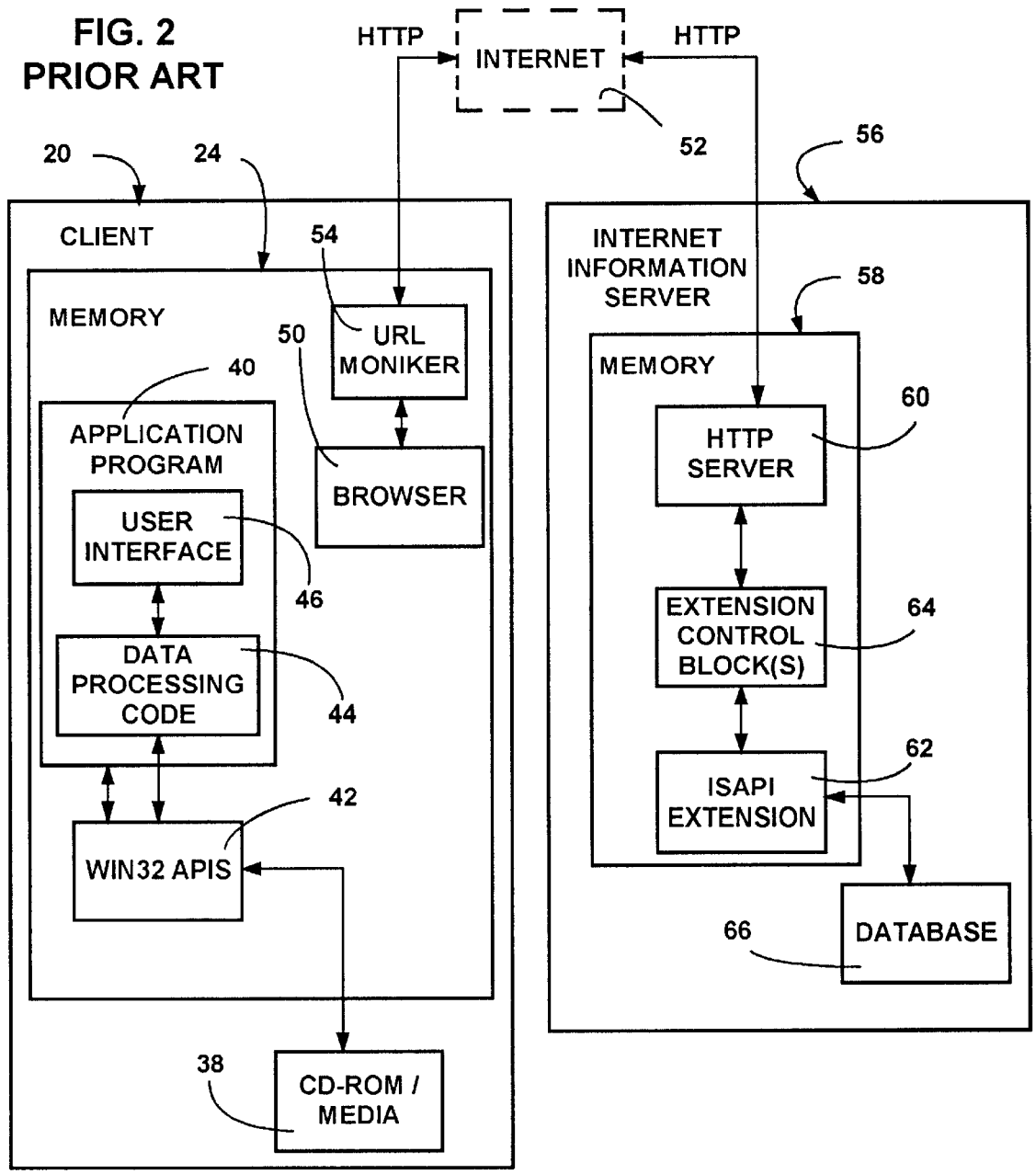
FIG. 2 is a block diagram representing a browser communicating with a remote extension according to the prior art.

By way of background, FIG. 2 shows the state of the prior art. As is well known, the client computer system 20 can include at least one conventional application program 40 which, for example, can receive instructions from the user-input device 30 (FIG. 1) to read information from the database 38. Also loaded in the memory 24 (but not shown herein for purposes of simplicity) is an operating system. In conjunction with the operating system, the application program 40 reads the database 38 by placing API calls to appropriate WIN32 APIs 42. The application program 40 typically includes code 44 for processing (e.g., formatting) the data read from the database 38, and also includes a user-interface 46 for outputting information related to the processed data for viewing by the user via the output device 34.

Moreover, in FIG. 2, the client computer system 20 has loaded in its memory 24 a browser 50 which provides the user with a graphical interface to the Internet 52. Communication over the Internet is via the Hypertext Transfer Protocol (HTTP). To simplify handling of the HTTP requirements, the browser 50 incorporates OLE object monikers, shown in FIG. 2 as a URL moniker 54.

As described in *Inside OLE* 2, Kraig Brockschmidt, Microsoft Press, (1993), monikers are persistent objects that encapsulate methods for both locating an object or data, and for retrieving that object or data into memory. For example, a file moniker points to a file on disk, from which the file can be located and/or the file data retrieved. Because the IMoniker interface is derived from IPersistStream, moniker objects can read and write themselves persistently to or from a data stream.

The two primary methods of the IMoniker interface are BindToStorage and BindToObject. BindToStorage instructs the moniker to bring back the data being pointed to by the moniker, a process known as "binding" the moniker. If the moniker points to an object, the BindToObject method instantiates the pointed-to object and returns an interface pointer to the client invoking the BindToObject method. Note that if BindToObject points to an object's persistent data, an instance of the object will be created and initialized with that persistent data, while if BindToObject is passed a CLSID (class ID) of an object, it will create a brand new instance of that object in a default-initialized state.

A URL is a string representing a name and location for an object such as a web page on the Internet. For example, a URL might be "http://www.microsoft.com/folderx/page4.html" where "http" identifies the protocol, and the remainder of the URL string specifies the location of the web page. As can be appreciated, since monikers simplify the handling of strings representing objects and data, URLs and monikers have been combined into URL monikers to reference data and objects located at Internet locations referenced by URLs.

Using monikers, the browser 50 is able to-locate and obtain the data of a web page on a remote server, and to hyperlink to other pages referenced thereby. More particularly, each link displayed by the browser 50 represents a document embedded in a web page having a URL associated therewith. When a user selects that link, the browser 50 calls an OLE function known as MkParseDisplayName, passing the link's URL as a parameter. MkParseDisplayName parses the URL, creates a corresponding (aynchronous) URL moniker 54 therefrom, and returns a pointer to the moniker's IMoniker interface. Asynchronous monikers are described in U.S. patent application Ser. No. 08/760924, assigned to the assignee of the present invention, and allow binding to retrieve an object's data without blocking. Calling the URL moniker's methods via its Imoniker interface retrieves the data, thus enabling the browser to display the document's contents.

At the other end of the connection to the Internet 52 is a server 56 that contains the remote data in its memory 58. The server includes an HTTP server component 60 that receives HTTP client requests, including the identity of an ISAPI extension 62 for execution. Upon receiving an appropriate client request, the HTTP server component 60 loads the ISAPI extension 62 (if not already loaded in the memory 58) and passes the client request data thereto as a parameter, via a data structure known as an EXTENSION_CONTROL_BLOCK 64 (described below with reference to FIG. 4).

As is known, the ISAPI extension 62 is a DLL that is coded to perform an operation on the received request data as desired by the developer thereof. For example, the purpose of one such extension 62 may be to service a user's query by accessing a server-side database 66, (e.g., CD-ROM device or the like with accompanying media), retrieving information therein related to the query and ranking the information. In a typical case, the extension 62 will format the result as an HTML document comprising information content, possibly including text, images, audio, video and even executable code. Note that in an HTML document, the various non-textual contents in a document are stored in separate files, incorporated into the HTML document by HTML tags that specify the locations of those files. The HTML document is returned to the URL moniker 54 as an object, whereby the browser 50 interfaces with methods in the object to display the content thereof. Note that HTML is not necessary to represent information to the user, as for example, a document can now be hosted in the frame of an ActiveX document container (such as Internet Explorer 3.0) in its native format.

Figure 3:
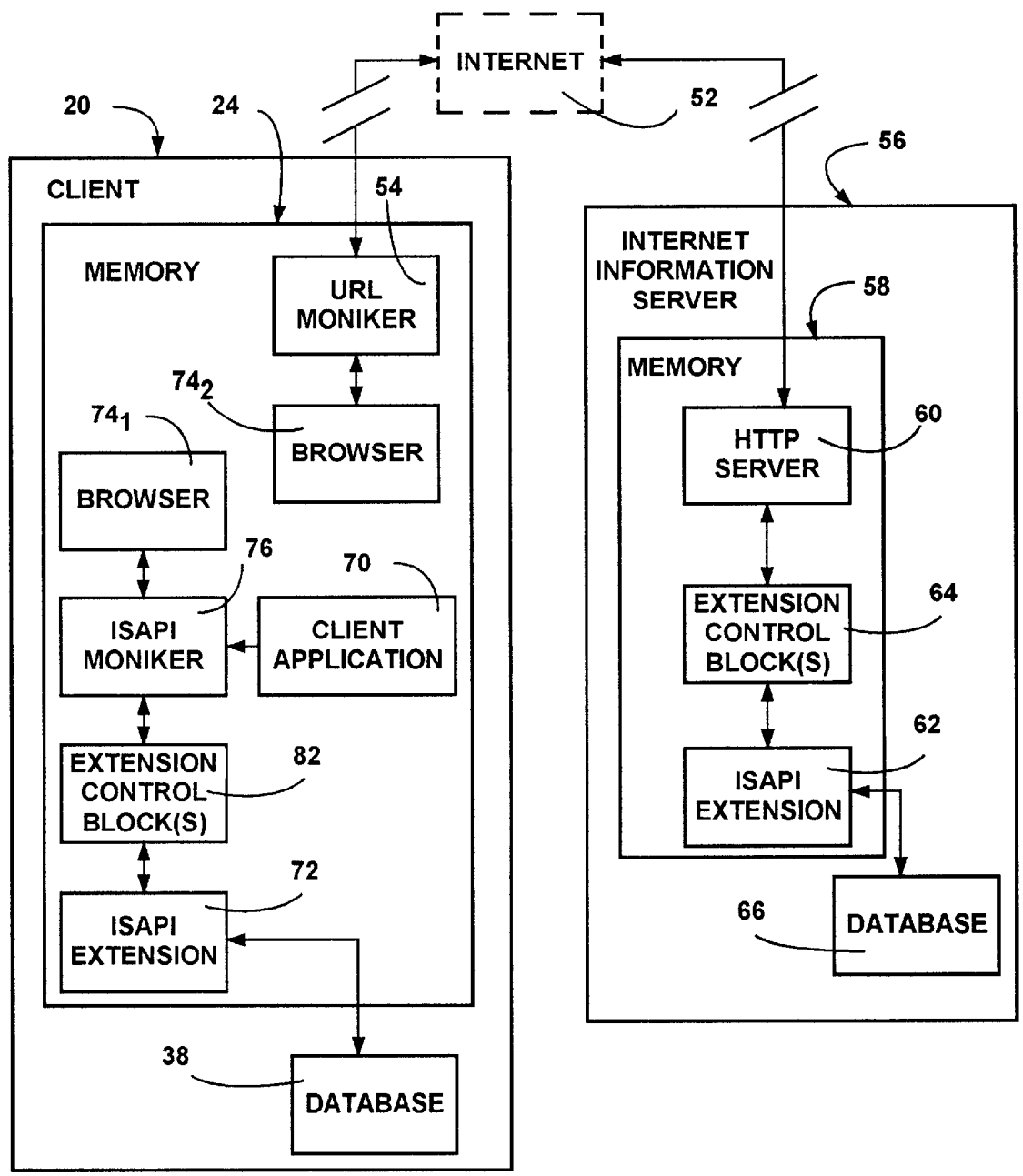
FIG. 3 is a block diagram representing a browser communicating with a local extension according to one aspect of the present invention.

In accordance with one aspect of the present invention, FIG. 3 shows a client computer system 20 having a client application 70 and a local ISAPI extension 72 present in the memory 24. As described above, the ISAPI extension 72 is a loaded DLL that executes according to whatever is coded therein. Indeed, the ISAPI extension 72 can be virtually identical to the exemplary ISAPI extension 62 described with respect to FIG. 2, i.e., it may service a user-query by first accessing the (local) database 38 to retrieve information therein related to the query, then ranking the information, and lastly formatting the result as an HTML document.

Note that the computer system can include more than one active browser, shown in FIG. 3 as distinct browsers $74_1$ and $74_2$, although it is understood that both browsers $74_1$ and $74_2$ may be different instances of the same executable file (preferably Microsoft's Internet Explorer) running in the memory 24. Moreover, as will become apparent below, it is understood that no connection to the Internet is necessary for the browser $74_1$ to communicate with the local ISAPI extension 72.

In accordance with another aspect of the invention, to enable the browser $74_1$ to interface with the local ISAPI extension 72, a new moniker, referred to herein as an ISAPI moniker 76, is provided. As described above, a browser such as Internet Explorer 3.0 can create and plug-in an appropriate moniker using the OLE API function called MkParseDisplayName. More particularly, this function has the following form:

HRESULT MkParseDisplayName(IBindCtx *pbc,
LPCWSTR pszName, ULONG *pchEaten, IMoniker **ppmk)

The MkParseDisplayName API function parses a text string (the parameter "pszName") into a moniker. The text string can have one of two initial patterns, that is, a uniform naming convention (UNC) path name (a conventional file system path name such as "c:/directory/file"), or the character "@" followed by a program identifier (ProgID) of a server application. In the case of a UNC path name, the API function creates a file moniker and calls the file moniker's "ParseDisplayName" function (described below) to parse the text string. In the case of a text string with the "@" character and ProgID, the API function creates an object based on a CLSID associated with the ProgID in the operating system's registry database and calls a "ParseDisplayName" member function on an "IParseDisplayName" interface of that object, which is defined as follows:
   interface IParseDisplayName : IUnknown{
      HRESULT ParseDisplayName(IBindContext *pbc,
         LPOLESTR pszDisplayName, ULONG *pchEaten,
         IMoniker **ppmkOut); };
By effectively plugging in a new name-to-moniker parser in this way, the MkParseDisplayName API can be extended to create new classes of monikers, including the ISAPI moniker 76. The ISAPI moniker 76 preferably allows for asynchronous operation.

The browser $74_1$ is provided with a link to the ISAPI extension 72 by the shortcut or the like that initially causes the browser $74_1$ to commence execution. By way of example, when the ISAPI-based database application 70 is initially installed in the client machine 20, the installation process results in a shortcut or the like being created, visible to the user on the output device 34 as an icon. The shortcut maintains the name of the ISAPI extension 72 (e.g., ISAPI:c:/extensions/foo.dll) that the application 70 wishes to run for accessing the data on the database 38. Also stored in the properties of the shortcut is the path and filename information necessary to start the browser $74_1$.

When the user clicks the appropriate icon, the shortcut starts the browser $74_1$, passing the name of the desired ISAPI extension 72 as the first link. The browser $74_1$ reads the name, and, because it begins with the string "ISAPI," creates the ISAPI moniker 76 using MkParseDisplayName, and also passes the remainder of the string to the moniker 76. Note that had the name begun with "HTTP," (such as when clicking a different shortcut for accessing the Internet), the browser would have instead created a URL moniker as described above.

As can be appreciated, an additional advantage to the present invention is that developers need not develop a separate user interface for their product. Instead, the local application 70 utilizes the client-side browser $74_1$ as the user interface. This is commercially practical because so many users presently have browsers loaded in their systems, or at least the ability to easily (often free-of-charge) add a browser. Using an existing browser as the user interface saves a great deal of development expense, while avoiding the problems inherent in familiarizing the user with yet another graphical interface. Indeed, in many applications the GUI is the most difficult to develop and time-consuming part of an application. Lastly, not having to provide a user interface results in a smaller program, which occupies less disk space on the client machine.

In any event, the code encapsulated within any ISAPI moniker, including the ISAPI moniker 76, knows how to properly talk to the ISAPI extension and to the browser $74_1$. More particularly, the moniker maps the IMoniker::BindToStorage and IStream::Read calls (from the browser $74_1$) into appropriate "Get" method calls used with extensions. The moniker 76 initially loads and runs the appropriately identified DLL, e.g., c:/extensions/foo.dll, by calling the DLL at the entry point of GetExtensionVersion. Note that the moniker object data includes the location name and some context information such as the handle to the DLL and parameter blocks. As with server-side extensions, the client-side extension 72 communicates with the moniker 76 through one or more extension control blocks 82.

FIG. 4 shows the structure of an extension control block 82. The use of the extension control block 82 with respect to an HTTP server is well documented, and thus its use for communication between the extension 72 and the moniker 76 need not be described in detail herein. Note, however, that upon loading, the DLL should be initially called at the entry point of GetExtensionVersion to retrieve the version number of the document on which the extension is based. This should be done to ensure proper initialization even though the retrieved information may be of no use to the local application 70. For every client request, the HttpExtensionProc entry point is called, (even though HTTP is not in use). In short, the ISAPI moniker 76 needs to appear to the extension 72 as a remote HTTP server, but can ignore any information returned from the extension that applies only to remote HTTP servers.

In any event, the extension receives commonly needed information such as the query string, path information, method name, and the translated path. To this end, the extension control block 82 includes fields such as cbSize enumerating the size of the block 82, dwversion, the version information of this document (the HIWORD contains the major version number), connID (IN), a unique number assigned by the HTTP server (or optionally, the moniker) and dwHttpStatusCode (OUT), the status when the current request is completed.

Other fields include lpszLogData (OUT), a buffer of the size set forth in HSE_LOG_BUFFER_LEN. This buffer contains a null-terminated log information string. The lpszMethod (IN) describes the method with which the request was made (and is equivalent to the CGI variable REQUEST_METHOD). The lpszQueryString (IN) holds a null-terminated string containing the query information, equivalent to the CGI variable QUERY_STRING. Other null terminated strings include lpszPathInfo (IN), which contains extra path information given by the client (equivalent to the CGI variable PATH_INFO) and lpszPathTranslated (IN), which contains the translated path (equivalent to the CGI variable PATH_TRANSLATED).

The total number of bytes to be received from the client, equivalent to the CGI variable CONTENT_LENGTH, is stored in the field named cbTotalBytes (IN). The cbAvailable (IN) field provides the available number of bytes (out of the total of cbTotalBytes) in the buffer pointed to by lpbData. If cbTotalBytes is the same as cbAvailable, the lpbData variable will point to a buffer that contains all the data as sent by the client. Otherwise, cbTotalBytes will contain the total number of bytes of data received. The lpbData (IN) field points to a buffer of size cbAvailable that has the data sent by the client. Lastly, the lpszContentType (IN) field contains a null-terminated string identifying the content type of the data sent by the client, and is equivalent to the CGI variable CONTENT_TYPE.

As can be seen from the foregoing detailed description, there is provided a method and mechanism for handling extensions written for a server on the client side. The method and mechanism enables developers to write a single extension for use with either server or client machines, and provides client applications that use an existing web browser as a user interface. The method and mechanism function without requiring any significant modifications to a web browser, while being highly efficient, flexible and extensible.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. A method of locally executing an extension written for a remotely located server, comprising, loading a browser in a local machine, providing information to the browser indicative of a location of the extension, determining whether the extension is available at the local machine or a remote machine based on the information, and when the extension has a local presence, selecting and invoking an interface from among at least two available interfaces between the browser and the extension based on the local presence of the extension, loading the extension in the local machine independent of a network connection, providing data to the extension via the interface by locally emulating in the interface at least some functions of the remotely located server, processing the data in the extension to produce a result, returning the result from the extension to the browser, and the browser displaying the result in a graphical format.

2. The method of claim 1 wherein providing information to the browser indicative of the location of the extension includes providing a character string thereto, and determining whether the extension is available at the local machine or a remote machine includes comparing the string provided to the browser with at least one predetermined character string.

3. The method of claim 1 wherein the result returned from the extension is incorporated in an HTML document, and wherein displaying the result includes interpreting the HTML document.

4. The method of claim 1 wherein the interface comprises a moniker object having a reference to the extension.

5. The method of claim 1 wherein the extension comprises a dynamic link library.

6. The method of claim 1 wherein providing data from the browser to the extension includes passing information to the extension through an extension control block.

7. The method of claim 1 wherein selecting an interface includes creating the interface.

8. The method of claim 1 wherein the available interfaces include an ISAPI moniker object and a URL moniker object, and wherein selecting an interface comprises selecting the ISAPI moniker object.

9. A computer-readable medium for performing the method of claim 1.

10. The method of claim 1 wherein locally emulating at least some functions of the remotely located server comprises mapping one type of function to another type of function.

11. The method of claim 1 wherein locally emulating at least some functions of the remotely located server comprises calling a particular entry point in the extension.

12. A method of interfacing a browser to an extension written for a remotely located server, comprising, loading a browser in a local machine, the browser capable of displaying a result returned from the extension in a graphical, human readable format, providing information to the browser indicative of the location of the extension, selecting a first interface between the browser and the extension when the location of the extension is local or a second interface when the location of the extension is remote, and, if the location of the extension is local,
    loading the extension in the local machine independent of a network connection, locally emulating in the first interface at least some of functions of the remotely located server including providing data from the browser to the extension via the first interface, processing the data in the extension to produce a result, and returning the result from the extension to the browser via the first interface, the browser displaying the result, and if the location of the extension is not local,
    loading the extension in a remote machine, providing data from the browser to the extension via the second interface, processing the data in the extension to produce a result, and returning the result from the extension to the browser via the second interface, the browser displaying the result.

13. The method of claim 12 wherein the first interface comprises an ISAPI moniker, and further comprising creating the ISAPI moniker.

14. The method of claim 12 wherein the second interface comprises a URL moniker, and further comprising creating the URL moniker.

15. The method of claim 12 wherein the first interface comprises an ISAPI moniker and the second interface comprises a URL moniker.

16. The method of claim 12 wherein the result returned from the extension is incorporated in an HTML document, and wherein displaying the result includes interpreting the HTML document.

17. A computer-readable medium for performing the method of claim 13.

18. The method of claim 12 wherein locally emulating at least some functions of the remotely located server comprises mapping one type of function to another type of function.

19. The method of claim 12 wherein locally emulating at least some functions of the remotely located server comprises calling a particular entry point in the extension.

* * * * *